Nov. 24, 1964   R. M. KELDAY ETAL   3,158,258
WIRE AND METHOD OF ITS PRODUCTION
Original Filed June 2, 1954   5 Sheets-Sheet 1
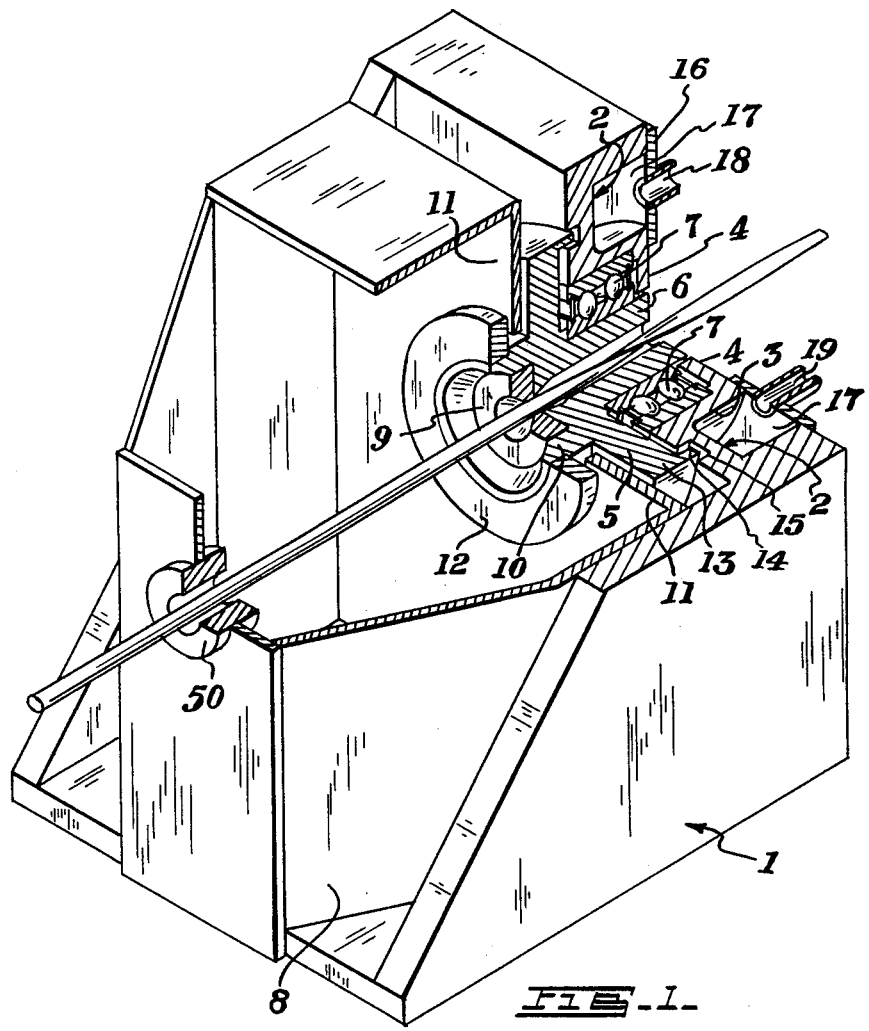
FIG.-1-
INVENTORS
ROY M. KELDAY
FREDERICK L. HAYDEN
BY
ATTORNEYS Nov. 24, 1964    R. M. KELDAY ETAL    3,158,258
WIRE AND METHOD OF ITS PRODUCTION
Original Filed June 2, 1954                 5 Sheets-Sheet 2
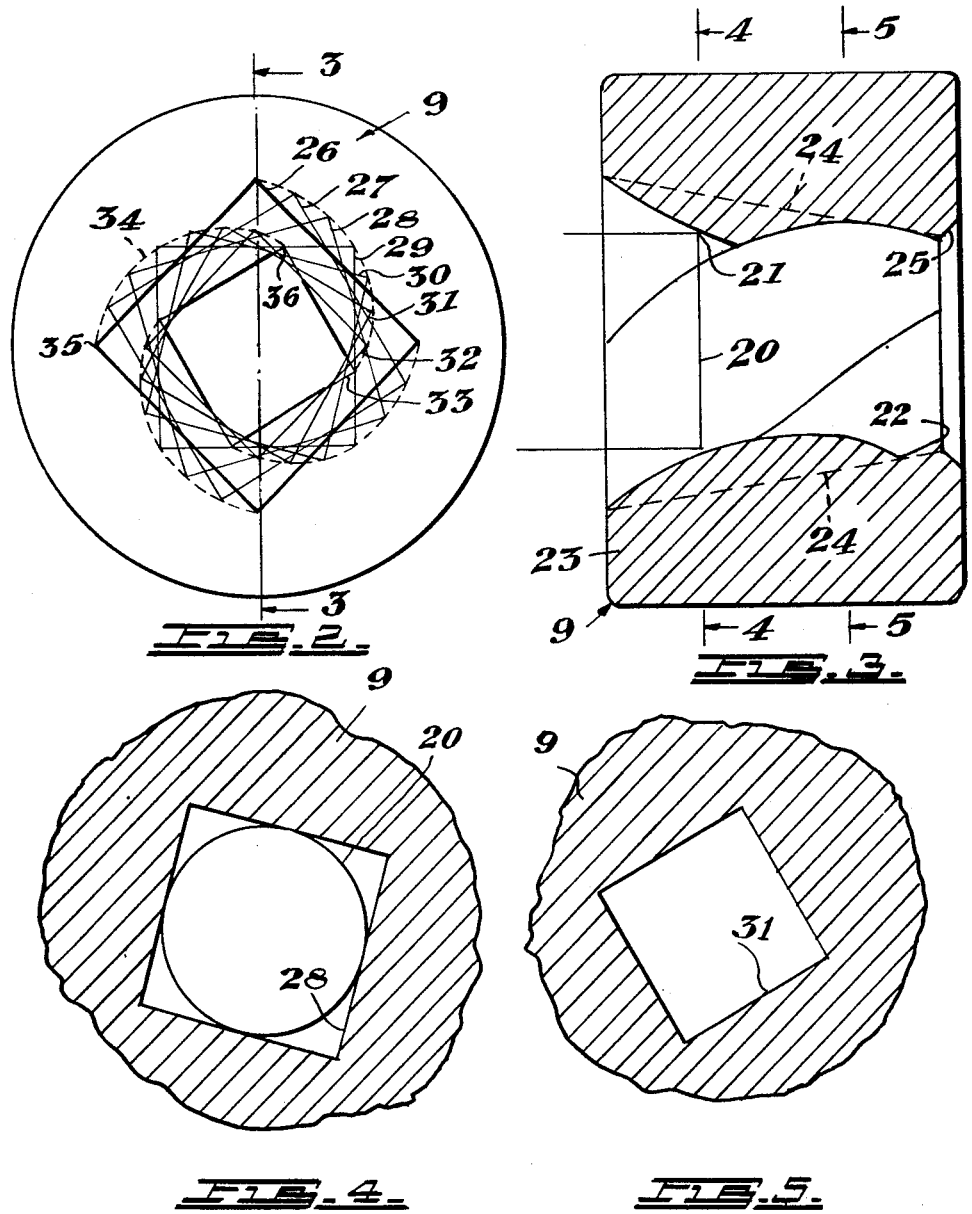
INVENTORS
ROY M. KELDAY
FREDERICK L. HAYDEN
By- Smart & Biggar
ATTORNEYS.

Nov. 24, 1964    R. M. KELDAY ETAL    3,158,258
WIRE AND METHOD OF ITS PRODUCTION
Original Filed June 2, 1954    5 Sheets-Sheet 3
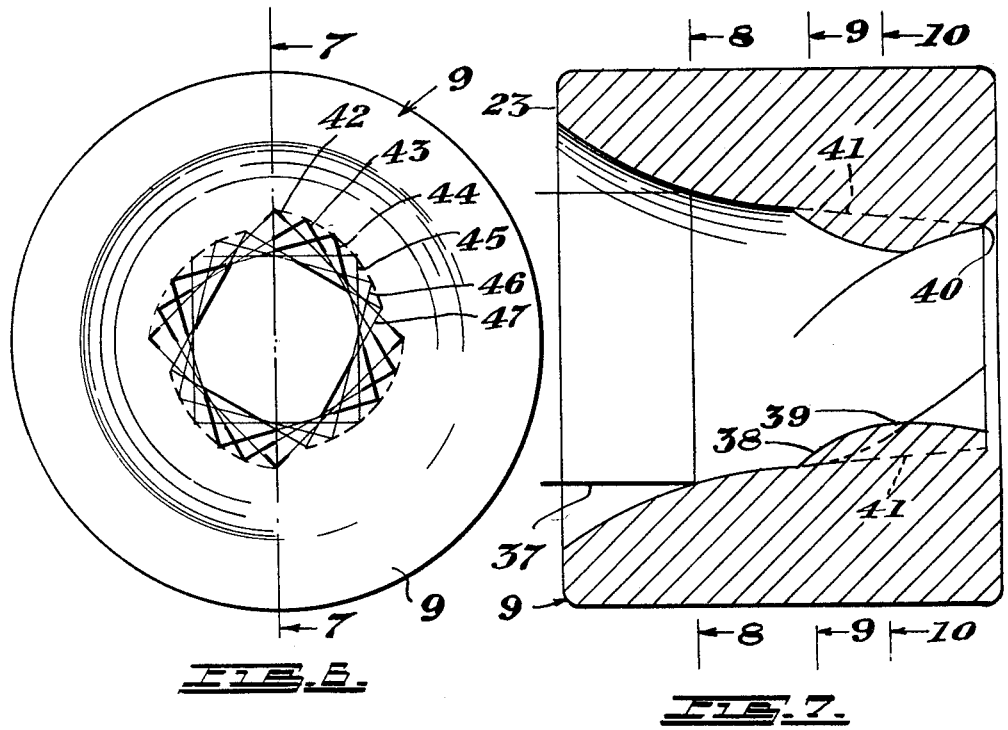
FIG. 6.    FIG. 7.
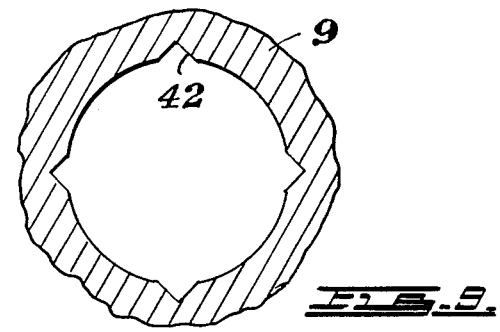   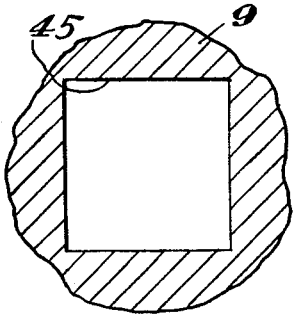
FIG. 8.    FIG. 10.
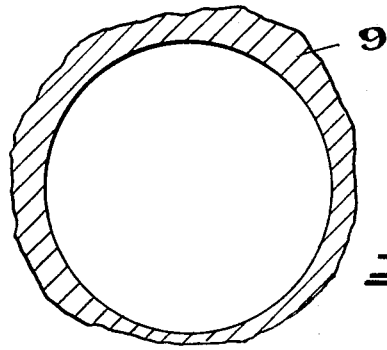
FIG. 9.
INVENTORS
ROY M. KELDAY
FREDERICK L. HAYDEN
By Smart & Biggar
ATTORNEYS.

Nov. 24, 1964 R. M. KELDAY ETAL 3,158,258
WIRE AND METHOD OF ITS PRODUCTION
Original Filed June 2, 1954 5 Sheets—Sheet 4
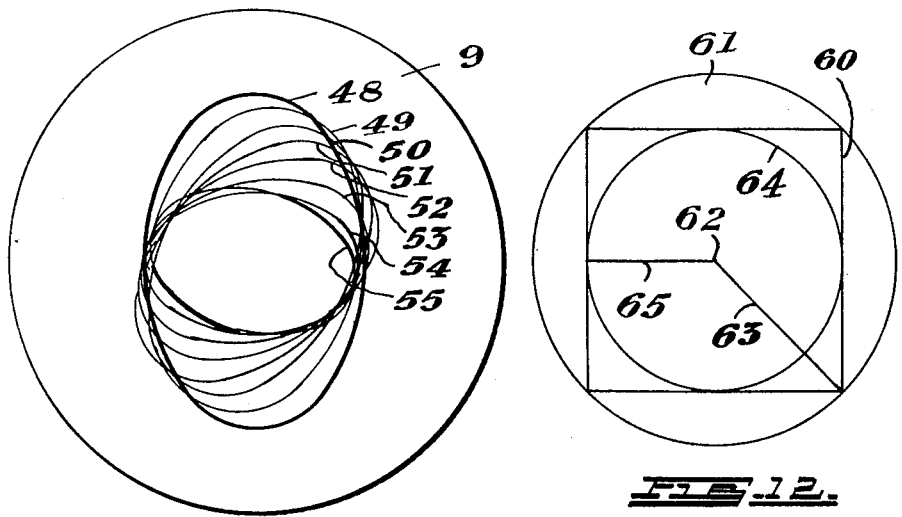
FIG. 11.   FIG. 12.
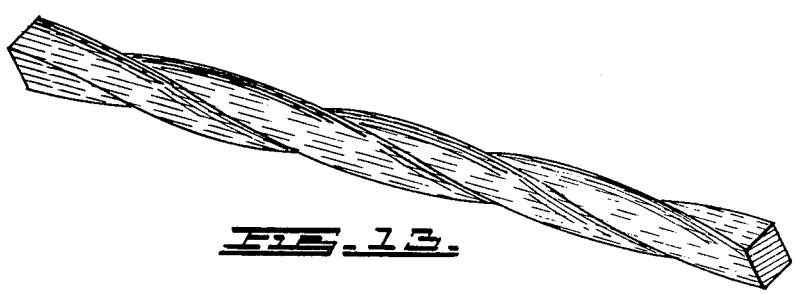
FIG. 13.
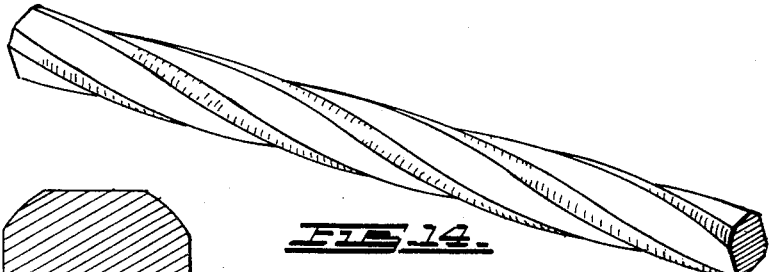
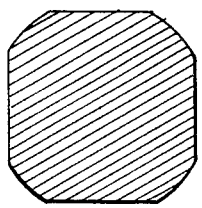
FIG. 15.   FIG. 14.
INVENTORS
ROY M. KELDAY
FREDERICK L. HAYDEN
BY Smart & Biggar
ATTORNEYS Nov. 24, 1964   R. M. KELDAY ETAL   3,158,258
WIRE AND METHOD OF ITS PRODUCTION
Original Filed June 2, 1954   5 Sheets-Sheet 5
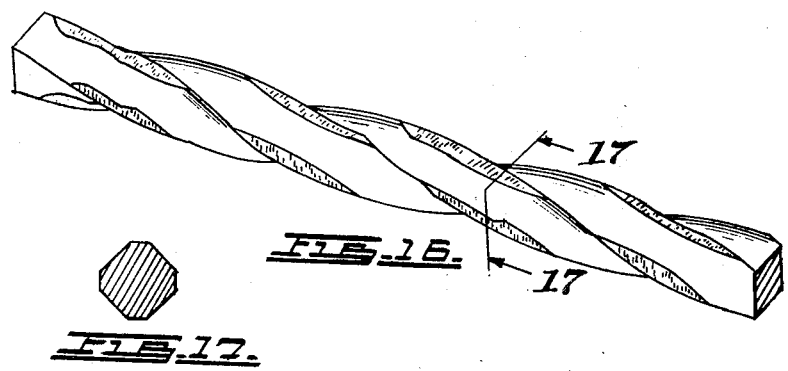
FIG. 16.
FIG. 17.
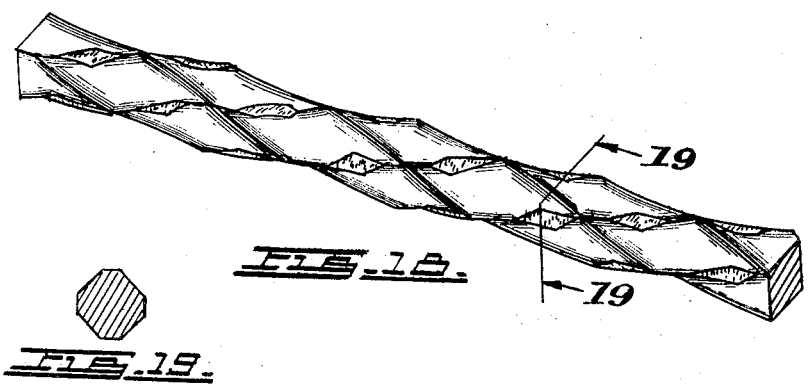
FIG. 18.
FIG. 19.
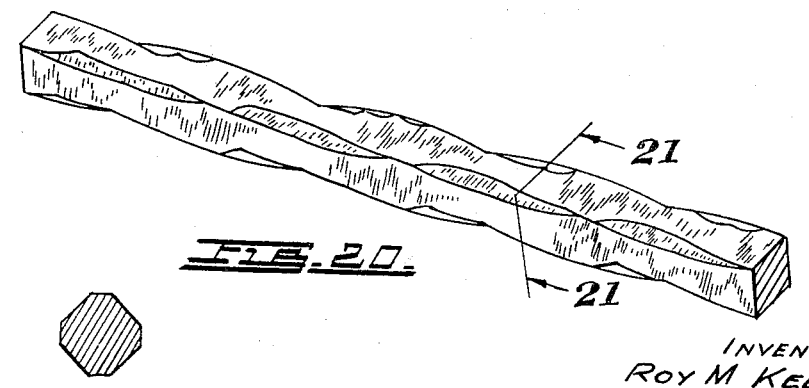
FIG. 20.
FIG. 21.
INVENTORS
ROY M KELDAY
FREDERICK L. HAYDEN
By- Smart & Biggar
ATTORNEYS

United States Patent Office 3,158,258
Patented Nov. 24, 1964

3,158,258
WIRE AND METHOD OF ITS PRODUCTION
Roy M. Kelday and Frederick L. Hayden, Hamilton, Ontario, Canada, assignors to The Steel Company of Canada Limited, Hamilton, Ontario, Canada
Original application June 2, 1954, Ser. No. 434,034, now Patent No. 2,928,528, dated Mar. 15, 1960. Divided and this application June 17, 1959, Ser. No. 820,947
3 Claims. (Cl. 205—15)

This invention relates to new and useful improvements in cold drawn (hereafter usually merely termed "drawn") wires, rods, bars and similar solid elongated drawn metal products, particularly where the metal is steel and in the production of such wires. The term "wire" will hereafter in this specification and claims be used in certain instances which will be obvious from the context, to designate all such drawn metal products collectively. The invention also relates to articles made from wire, particularly steel wire, e.g., nails, spikes, and other driven fastening devices, concrete reinforcement, barbed wire and non-skid gratings.

This application is a division of application 434,034, filed June 2, 1954 now Patent No. 2,928,528 March 15, 1960.

Wire of which the general cross-sectional shape is uniform and uniformly oriented along the length of the wire (hereinafter termed "conventional wire"), can at present be drawn in substantially any desired cross-sectional shape. Drawing effects a substantial cold working and reduction in cross-sectional area of the wire, and drawn conventional wire exhibits throughout its structure and over its whole surface cold drawn characteristics, which are more uniform the more nearly the general cross-sectional shape of the wire is circular. In conventional drawn steel wire, the grain flow lines can be seen to be uninterrupted and to lie wholly in planes which include the longitudinal axis of the wire, though they are not easily detectable in the case of metals other than steel. No practicable way has so far been devised of drawing wire which is other than conventional, for example of drawing helical wire, i.e. wire having a general cross-sectional shape which is non-circular and of which the orientation varies helically along the length of the wire.

Heretofore, for a great many years, helical wire articles have in practice been produced in one of three ways, all involving special operations on conventional drawn wire. One way, used in the manufacture of so-called threaded nails, has been to roll completed nails made from conventional round wire between two angularly ribbed plates or curved surfaces, thus rolling helical grooves into the nails. Another way, used in the manufacture of screws, has been to cut grooves in blanks made from conventional round wire. The third way, used to some extent in the manufacture of threaded nails and also in the production of other articles required to be formed of helical wire, has consisted of helically twisting conventional wire of non-circular cross-section about its longitudinal axis. The first two ways of helixing are essentially batch as opposed to continuous operations, and all involve very substantial expense, with the result that, for example, the cost of threaded nails is very substantially greater than that of comparable ordinary nails. Moreover, the rolling operation tends to alter at least the desirable surface structure imparted to the article by the cold drawing, with the result that, for example, it no longer exhibits cold drawn characteristics over its whole surface. The twisting operation, furthermore, can be carried out only on relatively soft wire; it sets up torsional stresses in the article and tends to distort its grain flow lines.

Over the last seventy years or more proposals have been made from time to time of devices for the continuous production of helixed wire. Most of these have been based on a number of rotatable cutters or rollers (at least three) mounted at an angle to the line of travel of the wire in a head which either is free to rotate or is positively rotated about the axis of the wire. All devices of this type suffer from a number of defects, among which may be mentioned extreme practical difficulty of satisfactory maintenance; the fact that uniformity in the product is not achieved since it is never practically possible to ensure that all the cutters or rollers act evenly on the wire; the fact that ragged edges are apt to be produced along the crests of the helices; and the fact that only indented shapes, such as crosses, as distinct from straight sided shapes, such as squares, or convexly curved shapes could in any event be made. Devices of this type have apparently been constructed and experimented with but appear never to have gone into practical commercial use. Other proposals have included the continuous twisting of conventional wire of non-circular cross-section; the drawing of wire through a die having a straight passage with a general cross-sectional shape other than circular and positively rotating the die to twist the wire between the die and the drawing block; and the drawing of wire through a positively rotated die having a passage of circular cross-section which becomes non-circular for a very short distance just at the exit, whereby, it is suggested, a helix is impressed on the wire without twisting it. None of these other proposals appears ever to have been practically used, and the practical art remains today essentially as it has stood for fifty years or more.

According to the present invention, wire is very easily and satisfactorily drawn, shaped and helixed in a single operation by drawing it through a rotatable die having a passage of which the general cross-sectional shape is non-circular over at least a substantial part of its working length and which is helically twisted about its longitudinal axis throughout the portion of non-circular cross-sectional shape.

It was proposed at least as long as seventy five years ago, though apparently without leading to any practical use, that the surfaces of lengths of thin tubular and even solid stock might be ornamented, without appreciably reducing or otherwise altering their cross-section, by passing them through a freely rotatable die having a passage of circular cross-section with parallel alternating shallow ribs and grooves formed on its wall and extending at an angle to its longitudinal axis. The object of these proposals was to produce decorative helical flutings on the stock for jewelry and similar uses.

The drawing operation of the present invention produces wire of substantially reduced and altered cross-section. According to the invention wire is, in a single operation, both drawn and given a general cross-sectional shape which is non-circular and of which the orientation is different at different points along the length of the wire. (The orientation of the cross-sectional shape referred to is in planes normal to the longitudinal axis of the wire, and, wherever, elsewhere in this description or the claims, orientation of the cross-sectional shape of the wire is referred to orientation in such planes is meant.) The cross-sectional shape or area or both, may, moreover, be made different at different points along the length of the wire.

Wire in accordance with the invention, drawn with a general cross-sectional shape which is non-circular and of which the orientation is different at different points along the length of the wire, has all the desirable qualities of conventional drawn wire. It exhibits cold drawn characteristics throughout its structure and over its whole surface and is substantially free from torsional stresses, such torsional stresses as it may have being merely those which arise from coiling and are found in conventional drawn wire. The grain flow lines, where detectable, are substantially uninterrupted and lie substantially wholly in planes including the longitudinal axis of the wire. It does not exhibit the striations or roll or vibration marks at right angles to the helix, the roughening along the valleys or indentations along the crests defining the helix, or the surface flaking to be found in wire articles in which helical grooves have been rolled.

The cross-sectional shape of wire according to the invention may be uniform along the length of the wire with its orientation varying helically along that length, or the cross-sectional shape or area or both may be different at different points along the length of the wire. Wire of which the cross-sectional shape is uniform along its length is sometimes referred to hereinafter as wire of simple form, and wire of which the cross-sectional shape or area is different at different points along its length is sometimes referred to hereinafter as wire of complex form. In the case of wire of simple form, the helical variation of its shape is of uniform lead along the length of the wire, and the cross-sectional shape and area is uniform along that length, though special steps may be taken controllably to vary the lead along the length of the wire.

According to a further feature of the invention many products of desirable characteristics are produced from wire of the present invention. Thus, improved barbed wire may be produced from wire according to the invention of simple form, and improved concrete reinforcement and non-skid gratings may be produced from wire according to the invention of complex form.

Wire of the invention may be produced with apparatus similar to the apparatus used for the drawing of conventional wire except for the formation of the drawing die and its mounting in the drawing apparatus. Like a die for the drawing of conventional wire of non-circular cross-section, a die according to the invention has a passage which gradually diminishes in cross-sectional area over a substantial part of its working length (i.e. that part of the passage with the wire comes into contact while being drawn), but in a die according to the invention the whole part of the working length of the passage which is of non-circular cross-section is helically twisted about its longitudinal axis. While a die for the drawing of conventional wire of non-circular cross-section is fixedly mounted in the drawing apparatus, a die according to the invention is mounted so that it is permitted to rotate about its longitudinal axis but is prevented from moving along that axis.

To obtain any drawing at all, it is of course necessary, as in the drawing of conventional wire, that the maximum radial dimension of the wire be greater than at least the minimum radial dimension of the passage at its effective cross-section (i.e. the minimum cross-section which determines the cross-section of the drawn wire). By the term "maximum radial dimension" is meant the radius of the smallest circle centered on the longitudinal axis which can be circumscribed about the cross-section of the wire (or passage) and by the term "minimum radial dimension" is meant the radius of the largest circle centered on the longitudinal axis which can be inscribed within the cross-section of the wire (or passage). According to the invention a drawn wire of simple form is produced by drawing through a die according to the invention a wire of which the minimum radial dimension is greater than the maximum radial dimension of the effective cross-section of the die passage. If the general cross-sectional shape of the wire to be drawn is circular, a drawn wire of simple shape will be produced even when the radius of the wire is smaller than the maximum radial dimension of the effective cross-section of the die passage. A drawn wire of complex form may be produced according to the invention by drawing through a die according to the invention a wire of which the general cross-sectional shape is non-circular and of which the minimum radial dimension is smaller than the maximum radial dimension of the effective cross-section of the die passage, or by drawing through a die having a passage of which the general cross-sectional shape is non-circular, a wire according to the invention of simple form and of which the minimum radial dimension is smaller than the maximum radial dimension of the effective cross-section of the passage. The die passage may be helically twisted in the opposite direction to the helixing of the wire.

The invention will be more fully described by reference to the attached drawings, in which:

FIGURE 1 is a general view, partly broken away of an apparatus suitable for producing wire in accordance with the invention, FIGURE 2 is a face view, partially diagrammatic, from the entry side of one form of die according to the invention with a passage of square cross-sectional shape, FIGURE 3 is a longitudinal section on the line 3—3 of FIGURE 2, FIGURES 4 and 5 are cross-sections on the lines 4—4 and 5—5 respectively of FIGURE 3, FIGURE 6 is a face view from the entry side of another form of die according to the invention, FIGURE 7 is a longitudinal section of the line 7—7 of FIGURE 6, FIGURES 8, 9 and 10 are cross-sections on the lines 8—8, 9—9 and 10—10 respectively of FIGURE 7, FIGURE 11 is a face view of a die according to the invention similar to that shown in FIGURE 2, except that the cross-section of the passage is oval, FIGURE 12 is a diagram illustrating the terms "maximum radial dimension" and "minimum radial dimension,"

FIGURE 13 is a perspective view of an example of a wire of simple form according to the invention, FIGURE 14 is a perspective view of another example of a wire of simple form according to the invention, FIGURE 15 is a cross-section on an enlarged scale of the wire of FIGURE 14, FIGURE 16 is a perspective view of an example of a wire of complex form according to the invention, FIGURE 17 is a cross-section on the line 17—17 of FIGURE 16, FIGURE 18 is a perspective view of another example of a wire of complex form according to the invention.

FIGURE 19 is a cross-section along the line 19—19 of FIGURE 18,

FIGURE 20 is a perspective view of a further example of a wire of complex form according to the invention, and FIGURE 21 is a cross-section on the line 21—21 of FIGURE 20.

FIGURE 1 illustrates, by way of example, one form of apparatus for practising the invention. In this apparatus the base 1 has a transverse wall 2 near its rear formed centrally with a sleeve 3 inwardly flanged at its rear end 4. A die holder 5 has a rear portion 6 within the sleeve 3 just fitting within the flange 4 and is supported for free rotation on the base by ball bearings 7 held between the sleeve 3 and portion 6. At the front of the base is mounted a conventional soap box 8 through which the wire passes for lubricating purposes before entering the die. The die 9 is secured within the front portion 10 of the die holder 5 which extends into the soap box 8 through an opening in the rear wall of the latter. It is important that the die be well centered and secured in the die holder to secure uniformity in the drawn wire. A ring 12 is secured to the forward end of the front portion 10 of the die holder inside the soap box, and the holder itself is radially flanged at 13 between the walls 2 and 11. The purpose of these flanges is to protect the bearing 7 from being reached by any soap from the box 8, and this baffling is preferably increased by a pheripheral bead 14 on the flange 13 which runs in a groove 15 in the wall 2. The clearances between the parts are of course exaggerated in the drawing for the sake of clearer illustration. An annular wall 16 secured to the rear end of the base defines with the outer wall of the base, the transverse wall 2 and the sleeve 3 an annular chamber 17 for the cooling fluid to counteract the frictional heat developed in the die during drawing and conveyed through the die holder to the bearing. Cooling fluid is circulated through the chamber 17 by inlet and outlet pipes 18 and 19.

Other suitable forms of apparatus permitting rotation of the drawing die may be used. The invention may be practiced in connection with bull blocks; moto blocks, both single and double deck; single block equipment; continuous drawing machines; and on the draw bench.

In dies for the drawing of conventional wire of non-circular cross-section the passage, in some cases, is of the desired cross-sectional shape throughout its length but, in other cases, is of circular cross-sectional shape over an initial portion of its length from the entry face of the die and of the desired cross-sectional shape over a remaining substantial portion of its length, the first shape merging into the second. Both forms may be used in a die according to the invention. In dies for the drawing of conventional wire the passage may be made of gradually diminishing cross-sectional area throughout the whole of its working length or throughout only a substantial part thereof, being formed near the exit end with what is termed a bearing, i.e. a portion of uniform cross-sectional area along its length. In a die for drawing wire according to the present invention the passage may be formed in either of these ways, though the first is preferred.

FIGURES 2–5 illustrate a die for drawing wire according to the invention with a passage of which the general cross-sectional shape is square. In the die illustrated the square cross-sectional shape of the passage is carried through its working length and the passage is of gradually diminishing cross-sectional area throughout this length. The wire presented to the die is diagrammatically shown at 20 in both FIGURE 3 and FIGURE 4. Referring to FIGURE 3, the working length of the passage is the length between the point 21 where the wire to be drawn first comes into contact with the passage and the point 22 where the cross-sectional area of the passage is at a minimum, the cross-section at the point 22 being that which determines the cross-section of the drawn wire and being termed the effective cross-section of the passage. From the entry face 23 of the die to the point 22, the cross-sectional area of the passage gradually diminishes as shown by the dotted lines 24 in FIGURE 3. Beyond the point 22 the passage flares outwardly in the relief 25.

The essential difference between the die illustrated in FIGURES 2–5 and a die for the drawing of conventional wire of square cross-section is that the passage through the die illustrated, instead of being straight, is helically twisted about its longitudinal axis. This is best illustrated in FIGURE 2 where the various squares indicate diagrammatically the area and orientation of various cross-sections of the passage from the entry face 23 to the point 22. The cross-section at the entry face is shown by the square 26, and that at the point 22 (marking the end of the working length) by the square 33. These are the only two squares that would be seen as such on looking into the die. The remaining squares 27–32 shown in lighter lines are included to indicate the gradual transition both in area and orientation of the cross-section of the passage between the entry face and the end of the working length. The orientation of the square 27 differs by 15° clockwise from that of the square 26, and the orientation of each other square correspondingly differs from the preceding one, the orientation of the square 33 thus differing by 105° from that of the square 26. The difference between the orientations of the squares 26 and 33, representing respectively the beginning and end of the working length of the passage, is 75°. Thus it will be seen that the passage illustrated is helically twisted through 75° over its working length, though this amount of twist is, it will be realized, purely illustrative. The area and orientation of the cross-section of the passage at the beginning of its working length and at a point somewhat more than half way along its working length is further shown in the cross-sections of the passage illustrated in FIGURES 4 and 5 respectively, the cross-sections in these figures, it will be noted, being taken looking towards the entry face of the die. The die passage illustrated in FIGURES 2 to 5 is in the form of a truncated twisted steep-sided pyramid with a square base, the lines following the corners of the pyramid being helical paths as can be seen in FIGURE 2 from a consideration, of for example, the line 34 joining the corner 35 of the square 26 to the corresponding corner 36 of the square 33 and following the corners of the intervening squares. This line also appears in part in FIGURE 3.

FIGURES 6–10 illustrate a form of die according to the invention in which the general cross-sectional shape of the passage, instead of being non-circular throughout the length of the passage, is circular over part of the working length and is non-circular (square in the case illustrated) over the remainder of that length.

In FIGURE 7 the wire presented to the die is diagrammatically shown at 37. At the point at which the wire comes into contact with the passage, the general cross-sectional shape of the latter, as appears from FIGURE 8, is circular. At the point 38 this shape has become partly square as shown in FIGURE 9, and at the point 39 is fully square as shown by FIGURE 10. From the point 39 until its effective cross-section is reached at the point 40 the passage continues to be of square cross-section, though of gradually diminishing cross-sectional area as shown by the dotted lines 41, and is helically twisted about its longitudinal axis.

In FIGURE 6 the orientation and cross-sectional area of the passage at the point 38 is shown by the four corners 42 and that at the point 40 by the square 47. The increasingly extended corners 43 and 44 indicate the gradual development of the square cross-section and the accompanying change of orientation, and the squares 45 and 46 show the further gradual change both in area and orientation until the point 40 is reached. The passage is helically twisted through 75° between the point 38 and the point 40.

The two dies described above are illustrative of dies in which the general cross-sectional shape of the passage is polygonal. The shape need not of course be square or even rectangular. It may be triangular or may even have more than four sides though this is seldom likely to be advantageous. In the case of any polygonal shape, the corners need not be sharp, as illustrated in connection with the dies described above, but may be, and often desirably are round.

FIGURE 11 illustrates a die of the same type as that shown in FIGURES 2–5 but in which the general cross-sectional shape of the pasage, instead of being polygonal, is oval (this term being used herein to mean an area bounded by any closed continuous curve of which one axis is substantially larger than the other at right angles to it). The oval 48 shows the cross-sectional area and orientation of the entrance of the passage, and the oval 55 shows the area and orientation of the effective cross-section of the passage just before the relief. The remaining ovals 49–54 shown in light lines indicate diagrammatically the gradual transition between these, the oval 50 indicating the area and orientation of the beginning of the working length. The die passage illustrated in FIGURE 11 is in the form of a truncated helically twisted cone of oval cross-section, the base being the oval 48 and the top the oval 55.

Wire is drawn through the apparatus described in the same way as through ordinary drawing apparatus. The conditions which apply to the drawing of conventional wire of non-circular cross-section apply in general to the drawign of wire in accordance with the invention, but, in addition, it is necessary, in the practice of the invention, to ensure that there is no excessive degree of reduction in each relative orientation of the cross-sections of the wire and passage, rather than merely in one such orientation as in the case of the drawing of conventional wire of non-circular cross-section. Thus, a wire of a given cross-sectional shape and area which could be satisfactorily drawn through a die having a straight passage of a given cross-sectional shape and area, might not draw satisfactorily through a die according to the invention having a helically twisted passage of the same cross-sectional shape and area because, although the degree of reduction would not be excessive in one relative orientation of the wire and passage, it might be excessive in another relative orientation, so that in that orientation the wire would not be drawn down.

In the drawing of wire according to the invention, somewhat more careful attention should be given than that required in the drawing of conventional wire to cleaning, coating and lubricants. The lubricant should be one having a high fat content and high melting point. A most satisfactory lubricant has been found to be Standard Industrial Chemicals No. 621. Special care should be taken in starting the drawing, proceeding gently at first and increasing speed very gradually. The wire should have a long tapered point free of slivers, which advantageously is pulled snugly into the die and a second grip taken on it before drawing starts. In the drawing, it has been found desirable to have the wire travel in a straight line from a point before it enters the die to the drawing block after it has passed through the die.

In the practice of the method of the invention, the die ordinarily rotates freely and without assistance by reason of the movement through it of the wire to be drawn. However, it is clear that the greater is the maximum helix angle in the passage (i.e. the maximum acute angle which any tangent to the helical curve of, for example, a corner of a square passage forms with the longitudinal axis of the passage) the greater is the tensile strain on the wire as it passes through the passage. Steel wire according to the invention has been successfully drawn through dies in which the maximum helix angle is somewhat in excess of 30°. The maximum helix angle which can be used without assisting the rotation of the die, will depend mainly upon the hardness of the wire, the degree of drawing, and the speed of drawing. If under any given conditions it is found that the strain on the wire with a given helix angle in the passage is too great, then it may be desirable to assist the rotation of the die by some suitable form of rotary drive. The helix angle will be greatest at the widest portion of the die passage and, as the lead should of course be the same throughout the length of the passage, will gradually diminish towards the effective cross-section of the passage as the passage becomes narrower.

It is found, in the drawing of wire according to the invention, that the lead of the drawn helixed wire is usually somewhat greater than the lead of the helix in the die passage. The extent of the difference depends generally upon the nature of the wire and the speed of drawing and upon the relative shape and size of the die passage and the wire presented to it. The difference is found to be greater the shorter is the lead in the passage. With wire of given nature drawn at a given speed through a die with a helically twisted passage of a given lead, the resulting drawn wire will be of uniform lead throughout its length. The lead of the drawn wire may, however, be controllably varied along the length of the wire, if that is in any case desirable, by periodically somewhat restraining the rotation of the die or by periodically increasing the tension on the drawn wire leaving the die, for example by passing this wire between the die and the drawing block over a rotating eccentric of which the rotation periodically increases the length of the path to be travelled by the wire between the die and block.

FIGURE 12 is a diagram illustrating the expressions "maximum radial dimension" and "minimum radial dimension," which have been defined and referred to above. The square 60 represents the cross-section of a wire or a passage. The circle 61 is, as will be seen, the smallest circle centred on the longitudinal axis 62 which could be circumscribed about the square 60. The radius 63 of this circle is thus the maximum radial dimension of the square. The circle 64 is the largest circle centred on the longitudinal axis 62 which would be inscribed within the square 60. The radius 65 of this circle 64 is thus the minimum radial dimension of the square 60.

If wire according to the invention of simple form is to be produced, the wire to be drawn is usually one having a general cross-sectional shape which is circular. If the radius of the wire to be drawn is greater than the maximum radial dimension of the effective cross-section of the die passage, then the cross-sectional shape of the drawn wire will be generally that of the effective cross-section of the passage. FIGURE 13 illustrates such a drawn steel wire where the die passage was of square cross-section. It will be seen that the cross-sectional shape of the wire is square throughout but that its orientation varies helically along the length of the wire. The faint dotted lines along the surface of the wire illustrate diagrammatically the grain flow lines which run, as in conventional wire, in line with the longitudinal axis though, since they run up over the crests and down across the valleys of the drawn wire, they are sinuous. These grain flow lines, it will be seen, are uninterrupted and lie wholly in planes which include the longitudinal axis of the wire.

It is often desirable to produce a wire according to the invention of simple form of which the general cross-sectional shape is polygonal, but with rounded corners. This can most conveniently be done by drawing through a die according to the invention, a round wire of which the radius is less than the maximum radial dimension of the die passage. FIGURE 14 illustrates a wire so produced with a die according to the invention having a passage of square cross-sectional shape. FIGURE 15 shows on an enlarged scale the general cross-sectional shape of this wire, which, it will be noted, is square with rounded corners.

As in the drawing of conventional wire, it is often necessary to effect two or more draws to reach a given cross-sectional shape for wire according to the invention. If this wire is to be of simple form, it has been found that the lead of the helix of the passage in the second and each subsequent die must be at least substantially the same as the lead of the helixed wire presented to it.

FIGURE 16 illustrates an example of wire according to the invention of complex form. This wire is produced by drawing through a die such as shown in FIGURES 2–5 a conventional wire of square cross-section, a side of the cross-section of the wire being shorter than the diagonal of the effective cross-section of the passage. It will be noted that at some points along its length, e.g. at the end of the piece shown in FIGURE 16, the wire is of square cross-section, whereas at other points, e.g. that at which the cross-section shown in FIGURE 17 is taken, the wire is of octagonal cross-section, the cross-sectional area at this point being smaller than the cross-sectional area where the cross-sectional shape is square. Along the wire the cross-section of one shape and area alternates regularly with that of the other shape and area, the cross-sectional area varying repeatedly and regularly along the length of the wire between a maximum (end of FIGURE 16) and a minimum (FIGURE 17).

Another example of a wire according to the invention of complex form is shown in FIGURE 18. This wire is produced by drawing a wire of simple form such as shown in FIGURE 13, helixed in a right hand direction, through a die such as shown in FIGURES 2–5 in which the passage is helically twisted in a left hand direction. As appears from the view of the end of the wire in FIGURE 18 and the cross-sectional view in FIGURE 19, the cross-sectional shape and area of the wire vary along its length from square and maximum to octagonal and minimum as in the case of the wire of FIGURE 16. However the alternation of shapes and areas is more frequent in the wire of FIGURE 18.

The further example of a wire of complex form according to the invention illustrated in FIGURES 20 and 21 is produced by drawing a wire of simple form such as shown in FIGURE 13 through a conventional die with a straight passage of square cross-section.

For the sake of simplicity the examples of wire according to the invention of complex form have all been illustrated on the basis of wire of square cross-section drawn through passages of square cross-section. However, the cross-sectional shape of the wire to be drawn may differ from that of the passage through which it is drawn and, in a case like that described with reference to FIGURE 18, the lead of the wire may differ from that of the die passage. An extremely wide variety of wires of complex form according to the invention may thus be produced.

In certain cases in the production of wire according to the invention of complex form, some torsional forces in the wire to be drawn may be developed owing to the greater resistance presented to its passage through the die in certain relative orientations of the cross-sectional shapes of the wire and the entrance to the die passage than in other such orientations. In such cases it may be desirable to restrain the wire to be drawn from any tendency to turn about its axis as it approaches the die.

The wire according to the invention enables the production of a variety of articles of improved characteristics and/or capable of being manufactured at substantial economies. Thus, threaded nails made from wire according to the invention of simple form have all the desirable characteristics of presently available threaded nails and can be produced at far less cost—in fact at a cost not appreciably exceeding that of ordinary nails. Threaded nails according to the invention may be made from wire produced by drawing through a die according to the invention, having a passage of square cross-section, a round wire of which the cross-sectional diameter is shorter than the length of a diagonal of the effective cross-section of the passage.

Ordinary barbed wire consists of two strands of line wire twisted together with the barbs held between them, the use of two strands of line wire being necessary to hold the barbs at the desired spacing along the length of the wire. According to the invention barbed wire may be made with a single line wire and barbs composed of wire according to the invention of simple form, preferably with a general cross-sectional shape which is polygonal with sharp corners. Normally the cross-sectional shape will be square or triangular. Such barbs, when wrapped around the line wire in the usual way, resist displacement along it by reason of the engagement of their corners with its surface. Alternatively, the converse arrangement of a single helixed line wire of simple form and barbs of conventional wire may be used. In certain cases both the line wire and the barbs may be formed of helixed wire of simple form.

An improved form of concrete reinforcement may be made according to the invention. At present concrete reinforcement is ordinarily made of conventional rolled or drawn rods. The rolled rods can be produced with patterned surfaces which increase the bonding of the concrete to them in the final structure, and consequently permit of a higher designed load for the structure. Drawn rods have an appreciably greater tensile strength than those that are rolled, and building specifications consequently allow a substantial increase in designed load where the reinforcement consists of drawn rods than when it consists of those that are rolled. According to the invention concrete reinforcing rods may be produced having advantages unobtainable in any such rods previously available. Concrete reinforcing rods according to the invention are drawn with different cross-sectional areas and shapes along their length. Preferably, the rods are formed as described in connection with FIGURE 18, the lead of one helix being desirably different from that of the other. They thus have the tensile strength of conventional drawn rods together with the advantages of increased bonding provided by the patterned rolled rods referred to above. With rods according to the invention, substantially higher designed loads in reinforced concrete structures are possible than with any rods previously available. This advantage is particularly significant for prestressed concrete construction where bonding of the steel reinforcement to the concrete is of special importance.

Non-skid gratings are used for a variety of purposes, for example, as the treads and landings of steel stairways and ladders, the non-skid feature being particularly important in circumstances where oil or grease is present, for example, in ships' engine rooms. One form of non-skid gratings at present widely used is one having bars of rectangular section running in one direction and helically twisted rods on top of these bars in a direction at right angles to them. The rods are forged down into the upper surface of the bars, this forging down being necessary to bring the upper surface of the bars into substantially the same plane as the upper surface of the rods, so that the bars act to arrest slippage in the direction of the helix angle of the rods. According to the invention a non-skid grating of entirely satisfactory characteristics is produced at a great saving of cost by forming the grating of rods drawn with different polygonal cross-sectional shapes at different points along the length of the rods. A satisfactory non-skid grating may be composed of such rods running in one direction only, the presence of rods or bars running in a direction at right angles being unnecessary for prevention of skidding because the rods referred to, being of complex rather than simple form, themselves offer resistance to skidding in all directions.

What we claim as our invention is:

1. The method of drawing wire with a general cross-sectional shape which is non-circular and of which the orientation varies helically along the length of the wire, which comprises drawing through a die, having a passage which is non-circular in general cross-sectional shape over a substantial part of its working length and is helically twisted about its longitudinal axis throughout said part, a wire of which the general cross-sectional shape is circular and of which the radius is smaller than the maximum radial dimension but larger than the minimum radial dimension of the effective cross-section of the die passage, and permitting said die to rotate about the longitudinal axis of the passage while preventing it from moving along said axis.

2. The method of drawing wire with a general cross-sectional shape which is polygonal and of which the orientation varies helically along the length of the wire, which comprises drawing through a die, having a passage which is polygonal in general cross-sectional shape over a substantial part of its working length and is helically twisted about its longitudinal axis throughout said part, a wire of which the minimum radial dimension is greater than the maximum radial dimension of the effective cross-section of the die passage, and permitting said die to rotate about the longitudinal axis of the passage while preventing it from moving along said axis.

3. The method of drawing wire with different cross-sectional shapes at different points along its length, which comprises drawing through a die, having a passage which is non-circular in general cross-sectional shape over a substantial part of its working length and is helically twisted about its longitudinal axis throughout said part, a wire of which the general cross-sectional shape is non-circular and of which the minimum radial dimensons smaller than the maximum radial dimension but larger than the minimum radial dimension of the effective cross-section of the die passage but the maximum radial dimension is larger than the minimum radial dimension of said effective cross-section, and permitting said die to rotate about the longitudinal axis of the passage while preventing it from moving along said axis.

References Cited in the file of this patent

UNITED STATES PATENTS

| | | |
|---|---|---|
| 946,631 | Ballou | Jan. 18, 1910 |
| 1,394,716 | Davies | Oct. 25, 1921 |
| 1,920,361 | Daneke | Aug. 1, 1933 |
| 1,986,987 | Trachsel | Jan. 8, 1935 |
| 2,060,858 | Flynt | Nov. 17, 1936 |
| 2,405,274 | Stites | Aug. 6, 1946 |

UNITED STATES PATENT OFFICE
CERTIFICATE OF CORRECTION

Patent No. 3,158,258                                November 24, 1964

Roy M. Kelday et al.

It is hereby certified that error appears in the above numbered patent requiring correction and that the said Letters Patent should read as corrected below.

Column 11, line 1, for "dimensons smaller" read -- dimension is smaller --.

Signed and sealed this 13th day of April 1965.

(SEAL)
Attest:

ERNEST W. SWIDER                                EDWARD J. BRENNER
Attesting Officer                                     Commissioner of Patents